US009482752B1

(12) United States Patent
Ryzhkov et al.

(10) Patent No.: US 9,482,752 B1
(45) Date of Patent: Nov. 1, 2016

(54) PROCESS FOR MEASURING CIRCULAR DEPOLARIZATION RATIOS IN A WEATHER RADAR

(71) Applicant: Enterprise Electronics Corporation, Enterprise, AL (US)

(72) Inventors: Alexander V. Ryzhkov, Norman, OK (US); Michael Bruce Knight, Enterprise, AL (US); Ryan Michael May, Norman, OK (US)

(73) Assignee: Enterprise Electronics Corporation, Enterprise, AL (US)

( * ) Notice: Subject to any disclaimer, the term of this patent is extended or adjusted under 35 U.S.C. 154(b) by 227 days.

(21) Appl. No.: 14/108,704

(22) Filed: Dec. 17, 2013

Related U.S. Application Data

(60) Provisional application No. 61/783,286, filed on Mar. 14, 2013, provisional application No. 61/805,510, filed on Mar. 26, 2013.

(51) Int. Cl.
   *G01S 13/95* (2006.01)
   *G01S 7/02* (2006.01)
   *H01Q 21/24* (2006.01)

(52) U.S. Cl.
   CPC .............. *G01S 13/95* (2013.01); *G01S 7/026* (2013.01); *H01Q 21/245* (2013.01)

(58) Field of Classification Search
   CPC ............... G01S 3/146; G01S 7/024–7/026; G01S 13/95–13/958; H01Q 21/245
   USPC .......... 342/26, 26 A, 26 B, 26 C, 26 D, 188
   See application file for complete search history.

(56) References Cited

U.S. PATENT DOCUMENTS

| | | | | |
|---|---|---|---|---|
| 4,123,160 A * | 10/1978 | Caputo | ................. | G01C 13/00 356/301 |
| 6,377,202 B1* | 4/2002 | Kropfli | ................. | G01S 13/953 342/175 |
| 6,448,923 B1* | 9/2002 | Zrnic | .................... | G01S 13/581 342/189 |
| 7,528,767 B2* | 5/2009 | Walker | .................... | G01S 7/025 342/174 |
| 8,098,189 B1* | 1/2012 | Woodell | ................. | G01S 7/025 342/188 |
| 8,188,906 B2* | 5/2012 | Mizutani | ................ | G01S 7/025 342/26 A |
| 8,601,864 B1* | 12/2013 | Eilts | ....................... | G01S 7/025 342/26 D |
| 8,854,250 B2* | 10/2014 | Keranen | ................ | G01S 7/025 342/175 |
| 2004/0056791 A1* | 3/2004 | Alford | .................... | G01S 7/025 342/26 R |

(Continued)

OTHER PUBLICATIONS

Sergey Y. Matrosov; Depolarization Estimates from Linear H and V Measurements with Weather Radars Operating in Simultaneous Transmission-Simultaneous Receiving Mode; Journal of Atmospheric and Oceanic Technology, vol. 21, pp. 574-583, Apr. 2004.*

(Continued)

*Primary Examiner* — Peter Bythrow
(74) *Attorney, Agent, or Firm* — The Gache Law Firm, P.C.; Russell C. Gache

(57) ABSTRACT

An apparatus and method for the pre and post processing of radar signals to allow for improved measuring of circular depolarization ratio data in a weather radar. The system uses a phase shifter, which is periodically calibrated to ensure proper polarity, to alter the transmission phase of one channel of a radar transmission output. Reflectivity signals are then processed in accordance with rules dependent upon the transmission phase shift to reliably extract circular depolarization ratio ("CDR") data from the reflectivity signals. CDR data is used to enhance hydrometer recognition in a weather radar system.

28 Claims, 8 Drawing Sheets

(56) References Cited

U.S. PATENT DOCUMENTS

| | | | | |
|---|---|---|---|---|
| 2005/0093734 A1* | 5/2005 | Alford | ............. | G01S 7/003 |
| | | | | 342/26 R |
| 2007/0222660 A1* | 9/2007 | Stagliano | ............. | G01S 7/025 |
| | | | | 342/26 R |
| 2007/0222661 A1* | 9/2007 | Stagliano | ............. | G01S 7/025 |
| | | | | 342/26 R |
| 2007/0273576 A1* | 11/2007 | Struckman | ............. | G01S 3/146 |
| | | | | 342/156 |
| 2009/0295627 A1* | 12/2009 | Venkatachalam | ..... | G01S 13/951 |
| | | | | 342/26 R |
| 2011/0063161 A1* | 3/2011 | Ishizawa | ............. | G01S 7/023 |
| | | | | 342/159 |
| 2014/0210661 A1* | 7/2014 | Balaji | ............. | G01S 7/025 |
| | | | | 342/174 |

OTHER PUBLICATIONS

Sergey Y. Matrosov; Depolarization Estimates from Linear H and V Measurements with Weather Radars Operating in Simultaneous Transmission—Simultaneous Receiving Mode; Journal of Atmospheric and Oceanic Technology, vol. 21, pp. 574-583, Apr. 2004.

\* cited by examiner

PROCESS FOR MEASURING CIRCULAR DEPOLARIZATION RATIOS IN A WEATHER RADAR

This application claims the benefit of filing priority under 35 U.S.C. §119 and 37 C.F.R. §1.78 of the U.S. Provisional Application Ser. No. 61/783,286 filed Mar. 14, 2013, for a SYSTEM AND METHOD FOR MEASURING CIRCULAR DEPOLARIZATION RATIO IN A RADAR, and also claims the benefit of filing priority under 35 U.S.C. §119 and 37 C.F.R. §1.78 of the U.S. Provisional Application Ser. No. 61/805,510 filed Mar. 26, 2013, for a SYSTEM AND METHOD FOR MEASURING CIRCULAR DEPOLARIZATION RATIO IN A RADAR (APPL. NO. 2). All information disclosed in those prior provisional applications is incorporated herein by reference.

FIELD OF THE INVENTION

The present invention relates generally to weather radar systems. In particular, the present invention relates to radar transmission techniques in simultaneous dual polarization radars. In greater particularity, the present invention relates to post processing of reflectivity data received in a simultaneous dual polarization radar.

BACKGROUND OF THE INVENTION

Most of the modern polarimetric weather radars provide the option of measuring linear depolarization ratio or "LDR." Historically, it was the first polarimetric variable measured by polarimetric weather radars and it was primarily utilized for hail detection and discrimination between rain and snow. For example, in the radar S-band frequencies for rain LDR is less than −25 dB, but is much higher for hail, melting snow, and non-meteorological scattering objects and atmospheric conditions.

In the LDR mode of operation, the waves with horizontal polarization are transmitted and the waves with both horizontal ("H") and vertical ("V") polarizations are received. In polarimetric radars utilizing the simultaneous transmission and reception of H and V waves (i.e. an "SHV" mode of operation) the differential reflectivity "ZDR," differential phase $\Phi$DP, and cross-correlation coefficients $\rho$hv may be measured. These variables are not practically measurable in an LDR mode of operation, and hence is one of the disadvantages of using an LDR mode of operation in polarimetric weather radars.

Another limitation in using an LDR mode of operation in polarimetric weather radars is the need to have a relatively high signal to noise ratio in order to effectively process reflectivity data from an LDR radar transmission. For example, a signal to noise ratio of at least 25-30 dB is required in order to make use of LDR in order to recognize objects of interest in the reflectivity data. Consequently, use of an LDR mode of operation is considered as a secondary mode of operation and is currently not widely used for operational applications, nor even accommodated in some configurations of polarimetric weather radars.

Other advantages of using CDR as opposed to LDR include receiving higher power magnitudes in reflectivity data so that CDR can be more reliably measured over larger areas and experiencing less ambiguity in meteorological interpretation because CDR is not affected by the orientation of atmospheric particles during transmission.

Hence, what is needed is a system that can estimate CDR in the linear polarization basis in addition to standard radar polarimetric radar variables commonly measured by operational weather radars, and to do so without affecting those data results by propagation effects.

SUMMARY OF THE INVENTION

An apparatus and method for the pre and post processing of radar signals to allow for improved measuring of circular depolarization ratio data in a weather radar. The system uses a phase shifter, which is periodically calibrated to ensure proper polarity, to alter the transmission phase of one channel of a radar transmission output. Reflectivity signals are then processed in accordance with rules dependent upon the transmission phase shift to reliably extract circular depolarization ratio ("CDR") data from the reflectivity signals. CDR data is used to enhance hydrometer recognition in a weather radar system.

Other features and objects and advantages of the present invention will become apparent from a reading of the following description as well as a study of the appended drawings.

BRIEF DESCRIPTION OF THE DRAWINGS

A system and method incorporating the features of the invention is depicted in the attached drawings which form a portion of the disclosure and wherein.

DESCRIPTION OF THE PREFERRED EMBODIMENTS

It will be noted initially that existing simultaneous dual polarization weather radar systems employ the use of a power splitter to equally divide the transmitter output into two independent transmission paths, one path for horizontal polarization and one path for vertical polarization. The two transmission paths are connected to an orthogonal mode transformer or "OMT", that is part of the overall antenna feed subsystem. When the two signals are combined in the OMT, the actual radiated polarization pattern is the result of the vector sum of the two independent signals. The resulting polarization state is therefore dependent on the system differential phase upon transmission between the vertical and horizontal channels.

Slight differences in the length and geometry between the two waveguide channels cause each channel to have different propagation effects resulting in a random, uncontrolled, yet stable differential phase upon transmission. This ultimately results in a random, uncontrolled, yet stable polarization state upon transmission. This is a common configuration in the industry used by all manufacturers of simultaneous dual polarization radars.

When the differential phase upon transmission is in-phase, the radiation pattern is pure 45 degree slant linear polarized. When the differential phase upon transmission is 90 degrees out-of-phase, the radiation pattern is circular polarized. All states of differential phase in between result in some form of elliptical polarization.

It is important to note that this phenomenon is not broadly known across the industry, as most dual polarization tutorials depict the dual polarization transmitter emitting pure linear vertical and horizontally polarized waves simultaneously. This is somewhat easier to envision, but it is not what actually occurs in a real system. The differential measurements in a dual polarization radar are constructed primarily as a function of the received signal into the OMT. However, controlling the transmit polarization state can have some advantages. Pure slant 45 degree polarization on transmission results in improved cross polarization isolation. Circular polarization on transmission results in an improvement in the estimate of the circular depolarization ratio (hereinafter "CDR"), as will be discussed.

Figure 5A:
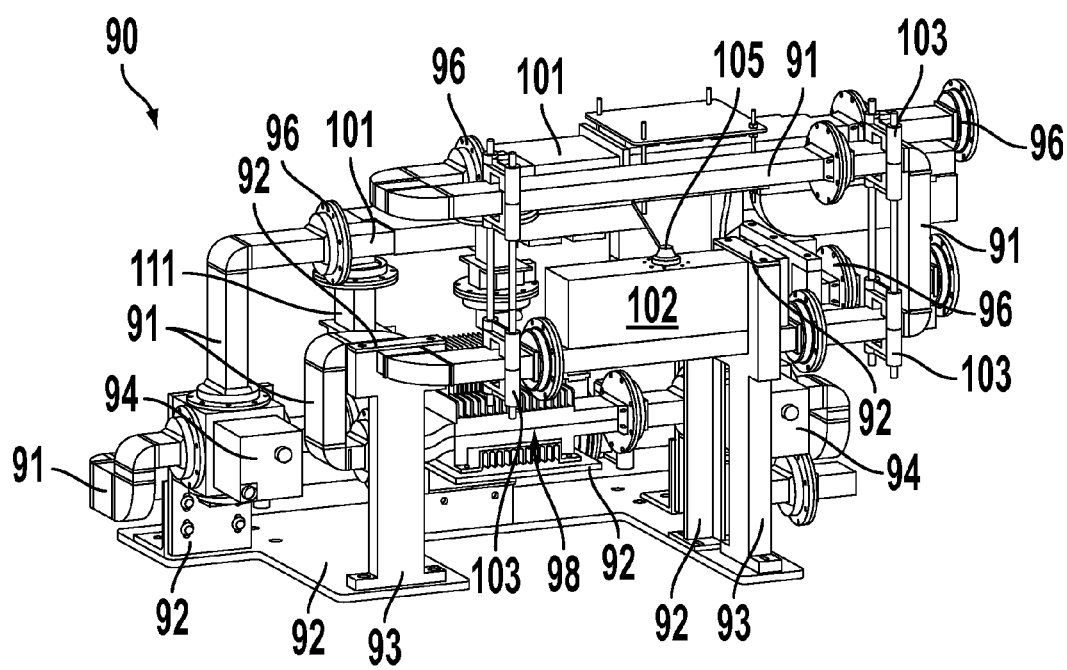
FIG. 5A is a front perspective view of a compact switch assembly used in the invention.
Figure 5B:
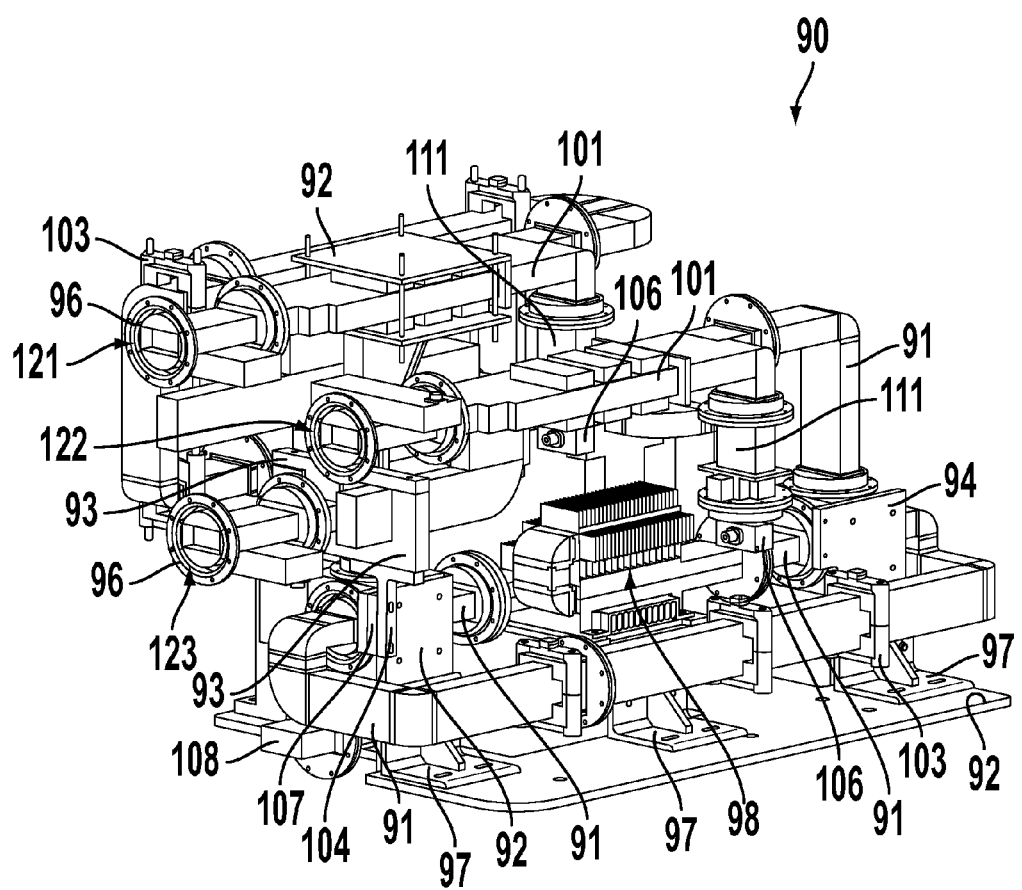
FIG. 5B is a rear perspective view of the compact switch assembly shown in FIG. 5A.

Calculations to yield CDR in polarimetric weather radars, such as for example the simultaneous dual polarization ("SIDPOL") radar disclosed in U.S. Pat. No. 6,859,163 B2, (hereinafter the "'163 patent") incorporated herein by reference, can be complex and must be experientially verifiable. Some modern polarimetric weather radars provide the option of measuring LDR as for example, as shown in FIG. 5 of the '163 patent. As indicated above, LDR data was the first polarimetric variable measured by polarimetric weather radars and it was primarily utilized for hail detection and discrimination between rain and snow because of its usefulness to differentiate rain and snow in radar reflectivity data. In an LDR mode of operation, waves with a horizontal spatial orientation or "polarization" are transmitted and the waves with both horizontal and vertical polarizations are received. In an SHV mode of simultaneous transmission and reception of H and V waves differential reflectivity ZDR, differential phase ΦDP, and cross-correlation coefficient ρhv may be measured. These variables are not measurable in the LDR mode which is one of its disadvantages along with a relatively high SNR of at least 25-30 dB.

However, measurements of depolarization ratio without switching the modes of operation so that ZDR, ΦDP, and ρhv are measured simultaneously with the circular depolarization ratio "CDR" are possible. CDR is noticeably higher than LDR which allows to partially mitigate the issue of low SNR. So, it is possible to estimate CDR in the SHV mode of operation by using the following function of complex voltages $V_h$ and $V_v$ from radar reflectivity signals:

$$DR = 10 \log(D_{dr}) \quad (1)$$

$$D_{dr} = \frac{\overline{|V_h - V_v|^2}}{\overline{|V_h + V_v|^2}} \quad (2)$$

With overbars indicating temporal averaging, the magnitude of DR computed from equations (1) and (2) depends not only on the properties of medium, but also on the system differential phases on transmission $\Phi_{DP}^{(t)}$ and reception $\Phi_{DP}^{(r)}$. As has been shown in published papers, DR is identical to the circular depolarization ratio CDR when the following condition is true:

$$\Phi_{DP}^{(r)} = -\Phi_{DP}^{(t)} = \pm 90 \quad (3)$$

This means that the radar system differential phase on transmission $\Phi_{DP}^{(t)}$ can be controlled and made equal to ±90° (i.e. the polarization of the transmitted radar wave is circular). To control this differential phase, a high-power phase shifter may be inserted into one of the orthogonal channels, thereby eliminating the transmission of arbitrary elliptical radiation (See FIG. 1, element 15). Differential phase on reception $\Phi_{DP}^{(r)}$ should also be equal to ±90°. If phase on transmission is not controlled, the difference between actual $\Phi_{DP}^{(r)}$ must be compensated in a signal processor by shifting the phase of the received signal in one of the orthogonal channels by the magnitude $\Phi_{DP}^{(r)} \pm 90°$.

Therefore, a modified formula for computing DR' to yield CDR is:

$$D'_{dr} = \frac{\overline{|V_h \exp[-j(\Phi_{DP}^{(r)} - 90)] - V_v|^2}}{\overline{|V_h \exp[-j(\Phi_{DP}^{(r)} - 90)] + V_v|^2}} \quad (4)$$

$$DR' = 10 \log(D'_{dr}).$$

The sum of $\Phi_{DP}^{(t)}$ and $\Phi_{DP}^{(r)}$ is the system differential phase $\Phi_{DP}^{(sys)}$ measured in the SHV mode according to the equation:

$$\Phi_{DP}^{(sys)} = \Phi_{DP}^{(t)} + \Phi_{DP}^{(r)} \quad (5)$$

This can be estimated to within the accuracy of about 10 using either a differential phase measurement from the closest weather echo (i.e. a selected object of interest in the radar transmission target area) or a histogram of differential phase of ground clutter in the absence of weather echoes. In order to estimate the phases $\Phi_{DP}^{(t)}$ and $\Phi_{DP}^{(r)}$ separately, the measurements of the system differential phases in the SHV and LDR modes are required $\Phi_{DP}^{(sys)}$ and $\Phi_{DP}^{(sysldr)}$ respectively). Hence, $$\Phi_{DP}^{(r)} = \Phi_{DP}^{(sysldr)} \text{ and } \Phi_{DP}^{(t)} = \Phi_{DP}^{(sys)} - \Phi_{DP}^{(sysldr)}; \quad (6)$$

but, note that the LDR mode of operation is needed for system calibration only. The phase shifter setting is adjusted until the total system differential phase in the SHV mode of operation becomes equal to $\Phi_{DP}^{(r)} \pm 90$. Once the optimal setting of the phase shifter is established, it can be continuously monitored by automatic data-based measurements of the system differential phase which should not vary by more than 5°-10°.

There are other important advantages to using CDR instead of LDR. First, CDR depends primarily on the "scatterers'" shape and does not depend on their orientations, but LDR reflectivity data depends on both the shapes and orientations of hydrometeors. Hence, the hydrometeor classification using CDR is more straightforward and unambiguous than with LDR.

Second, reflectivity power levels in CDR are higher than in LDR, and various moment data can be more reliably measured if the signal-to-noise ratio is not sufficiently high. For example, hydrometeors are randomly oriented and CDR reflectivity signals are 3 dB higher than LDR. Moreover, the difference between CDR and LDR power increases for oriented hydrometeors, and in rain CDR power can exceed LDR by more than 10 dB. Hence, CDR can be more reliably estimated in larger areas of storms than with LDR. Using CDR is not without its limitations. For example, CDR is more affected by propagation than LDR, and appropriate correction procedures must be implemented to compensate for such propagation effects. However, the propagation effects are much less pronounced at S band than at shorter wavelengths, and S band frequencies are currently preferred in polarimetric radars.

In SIDPOL type radars, CDR can be estimated from differential reflectivity ZDR, LDR data, cross-correlation coefficient ρhv, and differential phase ΦDP measured in a linear horizontal to vertical polarization basis using the following formula:

$$C_{dr} = \frac{\langle |S_{hh}\exp(-j\Phi_{DP}) \pm 2jS_{hv}\exp(-j\Phi_{DP}/2) - S_{vv}|^2 \rangle}{\langle |S_{hh}\exp(-j\Phi_{DP}) + S_{vv}|^2 \rangle} \quad (i)$$

with CDR=10 log($C_{dr}$)

where Sij are elements of the scattering matrix of hydrometeors. It can also be shown that $$C_{dr} = \frac{1 + Z_{dr}^{-2} - 2\rho_{hv}Z_{dr}^{-1}\cos(\Phi_{DP}) + 4L_{dr}}{1 + Z_{dr}^{-2} + 2\rho_{hv}Z_{dr}^{-1}\cos(\Phi_{DP})} \quad (ii)$$

In equation (ii), $Z_{dr}$ and $L_{dr}$ are differential reflectivity and $L_{DR}$ is expressed in linear units. As mentioned above, one of the limitations with circular depolarization ratio CDR is that it is strongly affected by propagation effects and differential phase shifting. Correction of CDR for differential phase has been a challenge and is one of the reasons why CDR has never been used for operational meteorological applications despite its attractiveness compared to linear depolarization ratio LDR which is only weakly affected by propagation effects. However, the technique shown below allows the measurement of CDR in the standard SHV mode of a SIDPOL radar and effectively eliminates the dependency of estimated CDR using differential phase.

The complex voltages of received signals in the two orthogonal channels of an SHV radar during transmission and reception for the H oriented and V oriented reflectivity waves are as follows:

$$V_h = C\{S_{hh}\exp[-j(\Phi_{DP} + \Phi_{DP}^{(t)} + \Phi_{DP}^{(r)})] + S_{hv}\exp[-j(\Phi_{DP}/2 + \Phi_{DP}^{(r)})]\} \quad (iii)$$

$$V_v = C\{S_{hv}\exp[-j(\Phi_{DP}/2 + \Phi_{DP}^{(t)})] + S_{vv}\}$$

In these equations, ΦDP is the propagation phase in the atmosphere and ΦDP(t) and ΦDP(r) are system differential phases on transmission and reception, respectively. Their sum is the total system differential phase ΦDP(sys). Based upon experiential data, the ratio shown below in equation (iv) accurately approximates intrinsic Cdr without compensating for propagation effects, but provided that the system differential phase on transmission ΦDP(t) is close to 90°.

$$D_{dr} = \frac{\langle |V_h\exp[j(\Phi_{DP} + \Phi_{DP}^{(sys)})] - V_v|^2 \rangle}{\langle |V_h\exp[j(\Phi_{DP} + \Phi_{DP}^{(sys)})] + V_v|^2 \rangle} \quad (iv)$$

Implementation of this scheme requires utilization of a high-power phase shifter to control ΦDP(t). With the assumption of a system differential phase on transmission ΦDP(t) close to 90°, an equation for $D_{dr}$ can be expanded to:

$$D_{dr} = \frac{1 + Z_{dr}^{-2} - 2\rho_{hv}Z_{dr}^{-1} + 4L_{dr}\sin^2(\Phi_{DP}/2 + \Phi_{DP}^{(t)})}{1 + Z_{dr}^{-2} + 2\rho_{hv}Z_{dr}^{-1} + 4L_{dr}\cos^2(\Phi_{DP}/2 + \Phi_{DP}^{(t)})} \quad (v)$$

Depolarization ratio $D_{dr}$ will still depend on ΦDP, but such dependence is much less than as described by above equation (ii).

The above proposed method for estimating CDR and correcting for propagation effects is effective and practical, but it does require capturing the total system differential phase (i.e. the sum of the differential phase on propagation and the system differential phase) which is commonly measured in a radar signal processor with sufficient accuracy. For example, in most modern weather radars such values are calculated to within 1°-2°. Note that the system differential phase changes from gate to gate, so it is important that the method not require very accurate calibration of the high-power phase shifter. The initial phase setting of the phase shifter should be set up during installation and its deviation during operation will not normally cause inaccuracies because drifts in the phase of 20°-30° using the above method will still be tolerable.

Initial setup or calibration of the phase shifter should be done using radar echoes from precipitation with sufficient intensity. The system differential phase on transmission ΦDP(t) is estimated as a difference between the full system differential phase ΦDP(sys) and the system differential phase on transmission ΦDP(r), estimated in the LDR mode of operation.

Another possible way to calibrate the setting of the phase shifter is to change it in iteratively increment the phase shifter phase settings by 10°, recording the CDR produced, and selecting the phase setting that produces the maximal CDR above the freezing level. This will obviate the use of an LDR mode altogether.

Therefore, a simpler method for estimation of CDR may be implemented and which does not require utilization of I and Q data and uses only second moments (e.g. "covariances") which may be calculated in current signal processors used in dual-polarization radars, such as for example in SIDPOL type radars.

Combining the above calculations and methods, CDR may be found by utilizing I and Q reflectivity data (i.e. the complex voltages of $V_h$ and $V_v$) in orthogonal channels to obtain CDR according to the following formula:

$$CDR(dB) = 10 \log(D_{dr}) \quad (a)$$

where $$D_{dr} = \frac{\frac{1}{M}\sum_{m=1}^{M} |V_h(m)\exp(j\Phi_{DP}) - V_v(m)|^2}{\frac{1}{M}\sum_{m=1}^{M} |V_h(m)\exp(j\Phi_{DP}) + V_v(m)|^2}, \quad (b)$$

M is the number of radar samples and ΦDP is the measured differential phase which is a sum of "true" differential phase and system differential phase. $D_{dr}$ can be simplified to the following:

$$D_{dr} = \frac{P_h + P_v - 2Re[R_{hv}\exp(-j\Phi_{DP})]}{P_h + P_v + 2Re[R_{hv}\exp(-j\Phi_{DP})]}, \quad (c)$$

with, $$P_h = \frac{1}{M}\sum_{m=1}^{M}|V_h(m)|^2 \quad (d)$$

equal to a power of the horizontally polarized component of the radar return, $$P_v = \frac{1}{M}\sum_{m=1}^{M}|V_v(m)|^2 \quad (e)$$

equal to a power of a vertically polarized component of the radar return, and $$R_{hv} = \frac{1}{M}\sum_{m=1}^{M}V_h^*(m)V_v(m) \quad (f)$$

is a complex covariance which has its phase equal to the estimate of differential phase ΦDP so that $$R_{hv} = |R_{hv}|\exp(j\Phi_{DP}) \quad (g)$$

Substituting Rhv in equation (g) into (c) yields the following final equation:

$$D_{dr} = \frac{P_h + P_v - 2|R_{hv}|}{P_h + P_v + 2|R_{hv}|} \quad (h)$$

or as an estimate, $$CDR(\text{dB}) = 10\log\left(\frac{P_h + P_v - 2|R_{hv}|}{P_h + P_v + 2|R_{hv}|}\right). \quad (i)$$

Therefore, CDR can be estimated using the combination of powers of the reflected signals at horizontal and vertical polarizations and the magnitude of the complex covariance $R_{hv}$. All three parameters may be obtained with the proper processing software at each range gate in a data processors, such as are typically used in polarimetric radars. Today, many of such data processors are off-the-shelf personal computers and the CDR can be calculated by the PC using the equation in (h). It should be re-emphasized that the equation CDR=10 log($D_{dr}$) approximates "true" CDR quite well, but only if the differential phase in each transmission channel, on transmission, is close to 90°. Hence there is a need to have a high-power phase shifter in one of the orthogonal channels of the radar system, the implementation of which will be shown below. Processing code written in C++ suitable to calculate CDR per the equations (a) through (h) above in a data processor, such as for example a PC, may be found in Tables 1 and 2 below.

Figure 1:
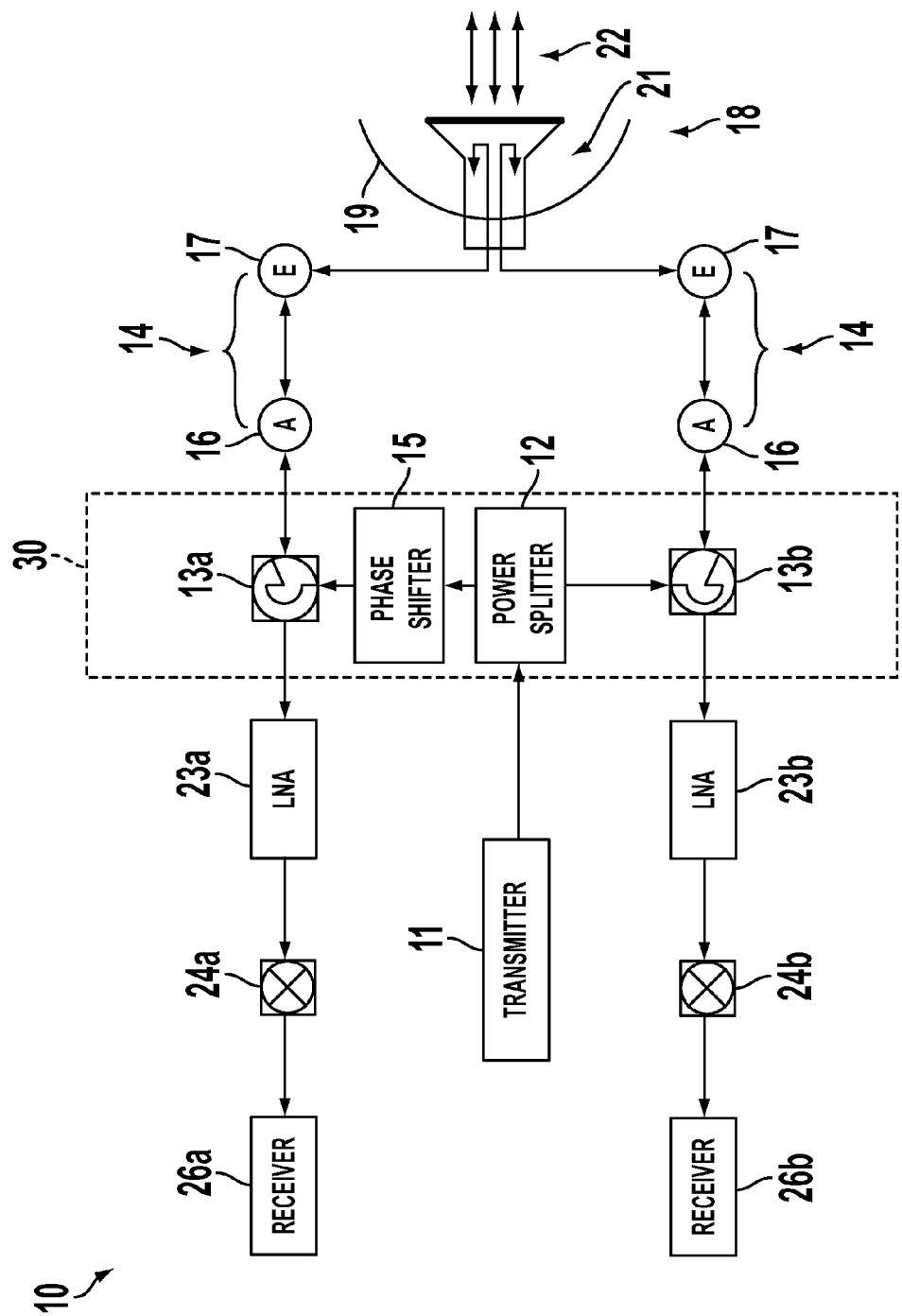
FIG. 1 a generalized hardware element diagram of the hardware for the invention.

Referring to FIG. 1, a system 10 is disclosed to enable the CDR calculations discussed above. Transmitter 11 provides a suitable weather radar transmission stream, such as for example in the S-band frequency, which is divided by power splitter 12 into horizontal and vertical streams. The transmission stream from the transmitter is conducted to a power splitter 12 via one or more waveguide tubes suitable for such transmissions. Further explanation of the use of waveguide tubes, waveguide couplers, and waveguide adapters between components in system 10 will be omitted as such elements are well understood in the industry and not necessary for a complete understanding of the herein described invention. The horizontal stream is passed to a high-power phase shifter 15, such as for example, offered by Coleman Microwave Company, located in Edinburg, Va., where the phase of the transmission stream is altered to be about 90° different in phase from the vertical transmission stream. Circulators 13a,b connect H and V transmission streams to antenna 18, while protecting receiver elements 26a,b. Azimuthal 16 and elevational 17 rotary joints 14 allow for communication of transmission streams from below the joints 14 to antenna 18 during rotation and elevational movement of the antenna relative to the receiver.

Figure 6A:
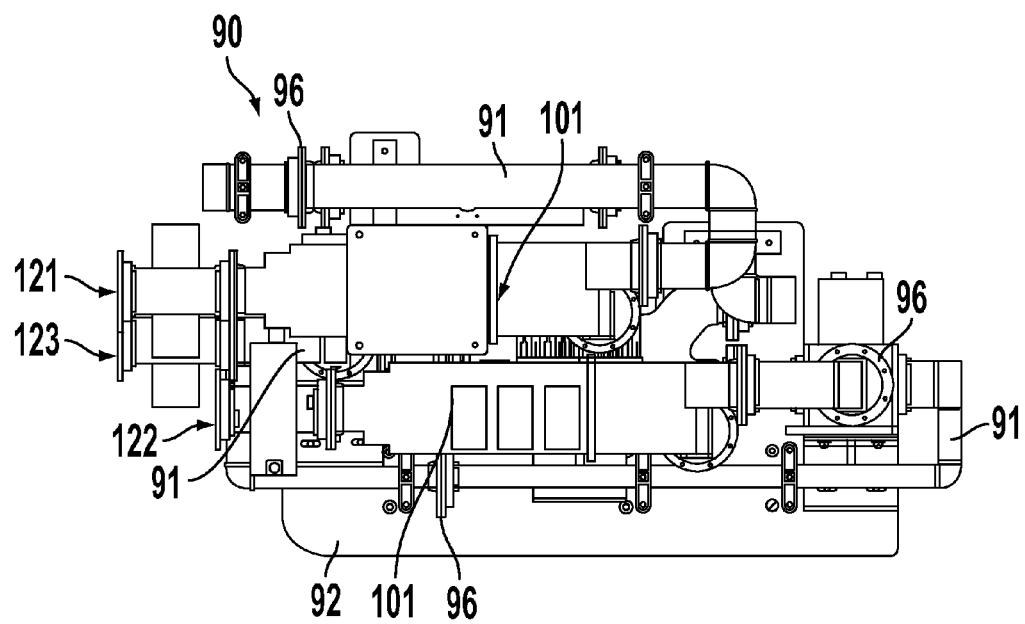
FIG. 6A is a plan view of the compact switch assembly shown in FIG. 5A.
Figure 6B:
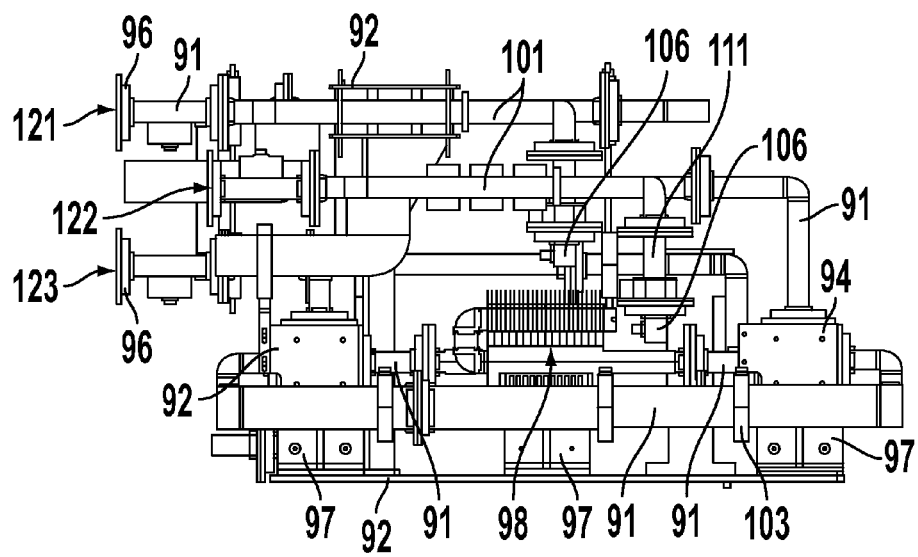
FIG. 6B is a rear elevational view of the compact switch assembly shown in FIG. 5A; and, FIG. 6C is a left side elevational view of the compact switch assembly shown in FIG. 5A.
Figure 6C:
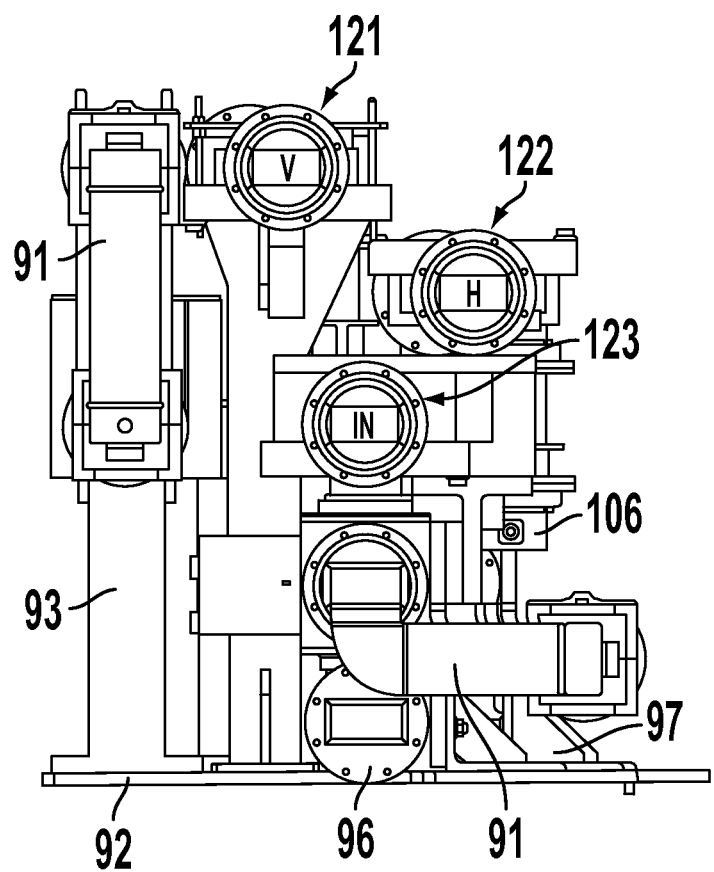

Antenna 18 includes a parabolic reflecting surface and an orthomode transducer or OMT with feed horn 21 for sending radar transmissions and receiving reflectivity data 22. Antenna 19 is positioned on a suitable gantry having movable gimbals and electronics to control the rotation and elevational angle of the antenna, as is known in the art. Antenna 19 is electrically connected to other elements in system 10 through appropriately positioned and shaped waveguides, as is also known. As will be further discussed, some grouping of radar transmission components 30 may be assembled into a compact volume to form a switching assembly as shown in FIGS. 5-6, which facilitates maintenance and fabrication of the entire radar system.

Receivers 26a,b, multipliers 24a,b, and low noise amplifier ("LNA") 23a,b receive radar system reflectivity signals 22 via circulators 13a,b for processing of reflectivity data. While a dual component configuration is shown in system 10, those skilled in the art will understand that such components may be integrated into single component configurations having separate processing channels (i.e. separate H and V channels).

The current system 10 shows the receivers 20, the LNA 23, multiplier 23, circulators 13, power splitter 12, and phase shifter 15 located below the azimuthal rotary joint 16. However, some weather radar configurations exist where these elements are located above the azimuthal rotary joint and even above the elevational joint to enjoy a reduction in radar wave transmission distortions. In these types of configurations the herein described system 10 would position those elements above joint 14, except for the transmitter 11. The disclosed system 10 shown in FIG. 1 is currently the most popular system arrangement, although this is changing in favor of antenna mounted electronics in which most of the electronics are located above the elevational coupling.

Regarding the phase shifter 15, FIG. 1 does not specifically delineate which path or channel in the system 10 after the power splitter will be a vertically oriented or horizontally oriented transmission as determined by the OMT. This is purposeful since the present invention will work effectively whether the phase shifter 15 is positioned in the vertical or horizontal transmission channel, although traditionally the phase shifter 15 would be located in the horizontal channel.

Figure 2:
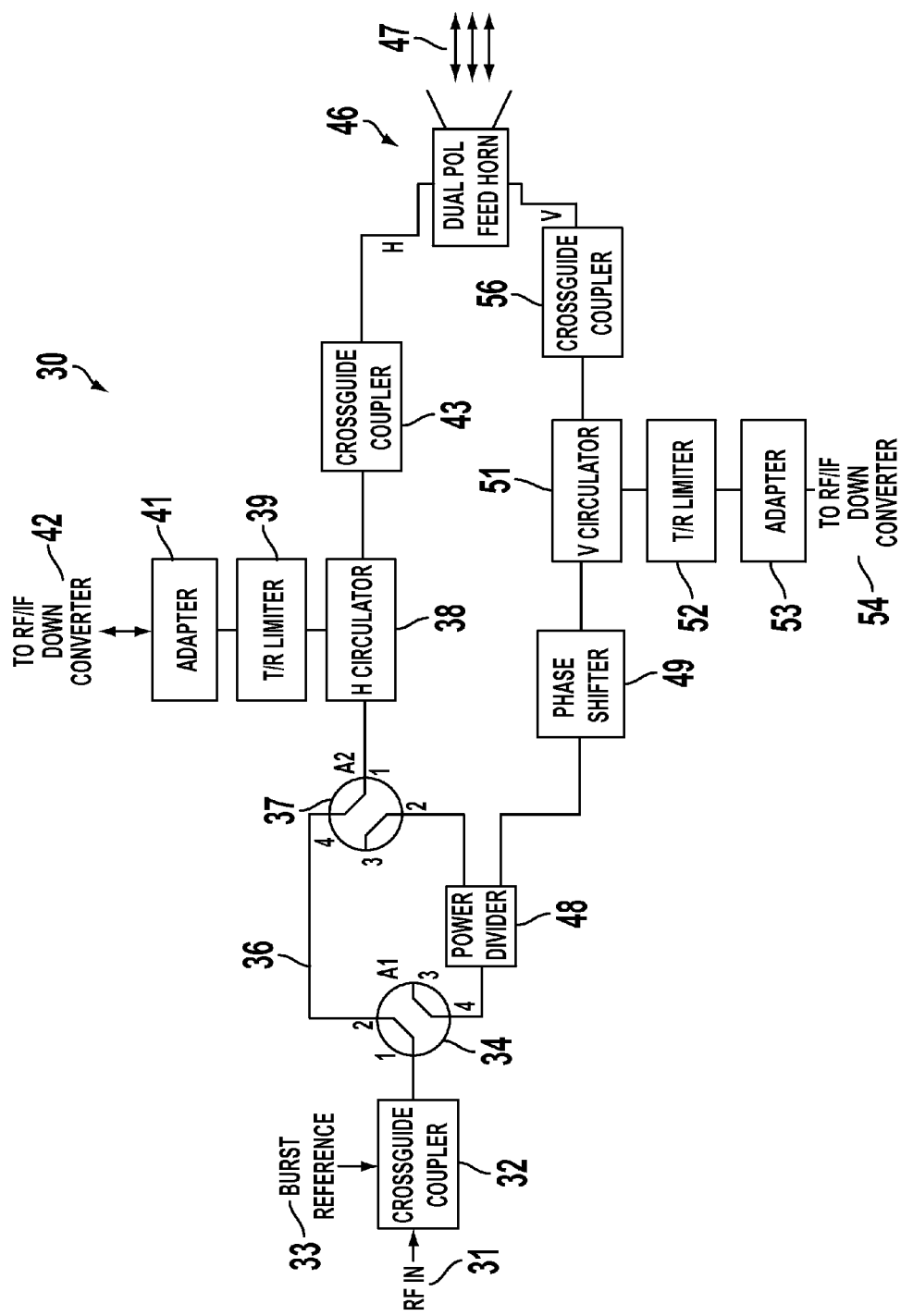
FIG. 2 is a potential hardware implementation for the invention.
Figure 3:
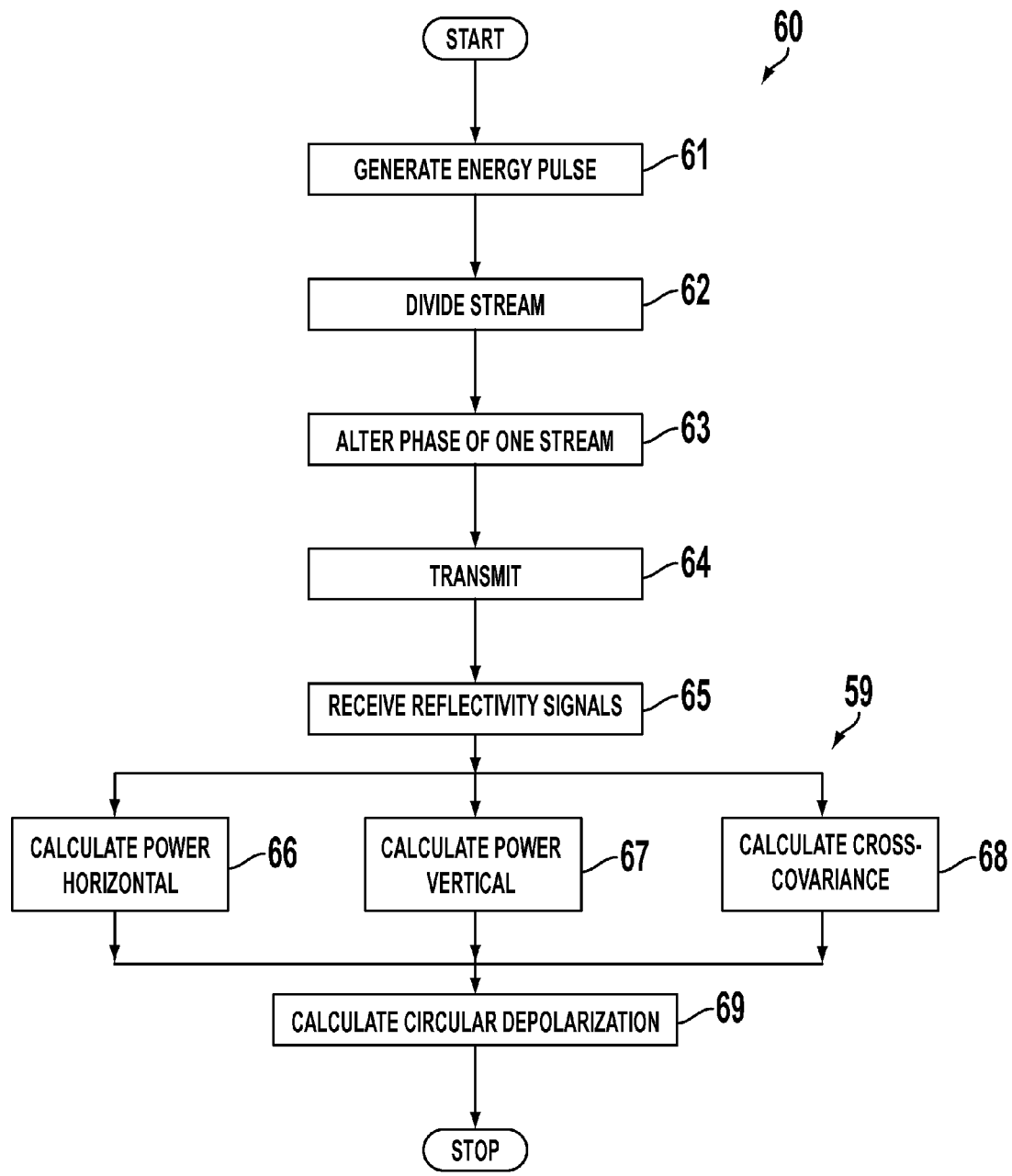
FIG. 3 is process flow diagram for the invention.

FIG. 2 provides a schematic diagram of some of the components for system 10 in a compact switching assembly 30. A transmitter such as a Klystron S-band transmitter provides a radio frequency pulse train 31 suitable for weather radar applications to a cross-guide coupler and into a star switch 34, along with a burst reference signal input 33. Star switch 34 may be configured to route pulse train 31 via ports 1-2 or ports 1-4 on demand. Similarly, star switch 37 may be configured on demand to route a pulse train via ports 4-1 or via ports 2-1. By configuring star switch 34 to route pulse train 31 via ports 1-4 and configuring star switch 37 to route pulse train 31 via ports 2-1 pulse train 31 can be routed through power divider 48 and its transmission stream divided equally into two paths that pass to both circulators 38 and 51. Orienting the ports in switches 34 and 37 in this manner configures the system 10 for SHV operation, such as for example in a SIDPOL type of radar.

However, switches 34 and 37 may be set to bypass power divider 48 by selecting ports 1-2 in switch 34 and ports 4-1 in switch 37 so that through path 36 full power transmissions of pulse train 31 may be achieved through horizontal channel circulator 38, thereby configuring system 10 for LDR operation. Therefore, as may be seen, the arrangement of two star as shown allows a radar system to perform in both an SHV and LDR mode of operation upon demand.

Circulators 38 and 51 isolate transmission stream 31 from receiver elements such as T/R limiters, 39/52 and down converters 42/54, so that these sensitive elements are not damaged by the high power of transmissions 31.

Phase shifter 49 in the assembly 30 is positioned in the V channel, but can be relocated into the H channel and still allow performance of the switching assembly 30. As indicated above, phase shifter 49 is used to alter the phase of channel V by about 90° relative to channel H. Phase shifter 49 is typically a high-power phase shifter having a switch or dial to configure the amount and direction of phase shift. Some models of phase shifters include motorized switches to allow, theoretically, for electronic control of the phase shifter rather than manual control.

Utilizing the system shown in FIGS. 1 and 2, a process 60 for calculating CDR may be achieved based upon the formulas (a)-(i) shown above. Initially, the system 10 is configured for SHV mode and an energy pulse train suitable for radar transmissions is generated 61. The transmission stream is divided 62 such as through a power splitter 12 and the phase of one of the divided streams is altered by about 90°. For the purposes of the herein disclosed process 60, "about 90°" is defined as 90° plus or minus 10°. I will be noted that a phase difference of 90° does not necessarily normalize one channel or the other in system 10 to 0°, or to any other particular phase value. The system will operate in accordance with equations in the steps indicated in process 60 as long as the difference between each transmission channel is about 90°. Hence, process 60 is generally phase insensitive with respect to the phase established in the pulse generation step 61 or division step 62 as long as the difference between each channel is about 90°.

After phase alteration of one transmission channel, the transmissions are propagated into space 64 as, for example, through an antenna 18, and reflectivity signals 22 captured by antenna 18 and sent to a receiver 65. The reflectivity signals are then processed to calculate various values 59, such as for example in a PC.

Pursuant to the above equation (d) the power of the horizontally polarized component of the system 10 is estimated 66. Pursuant to the equation (e) the power of the vertically polarized component of the system 10 is also estimated 67. And, a cross-covariance calculated 68 in accordance with above equation (f), where $V_h$ and $V_v$ are complex voltages and M is the number of radar samples in a dwell time period during transmission. It should be noted that steps 66-68 may be calculated in parallel, or serially in any order since the $V_h$ and $V_v$ complex voltages are already present in the captured reflectivity data. Based upon the results obtained in steps 66-68, CDR may then be calculated based upon the above equation (i).

Figure 4:
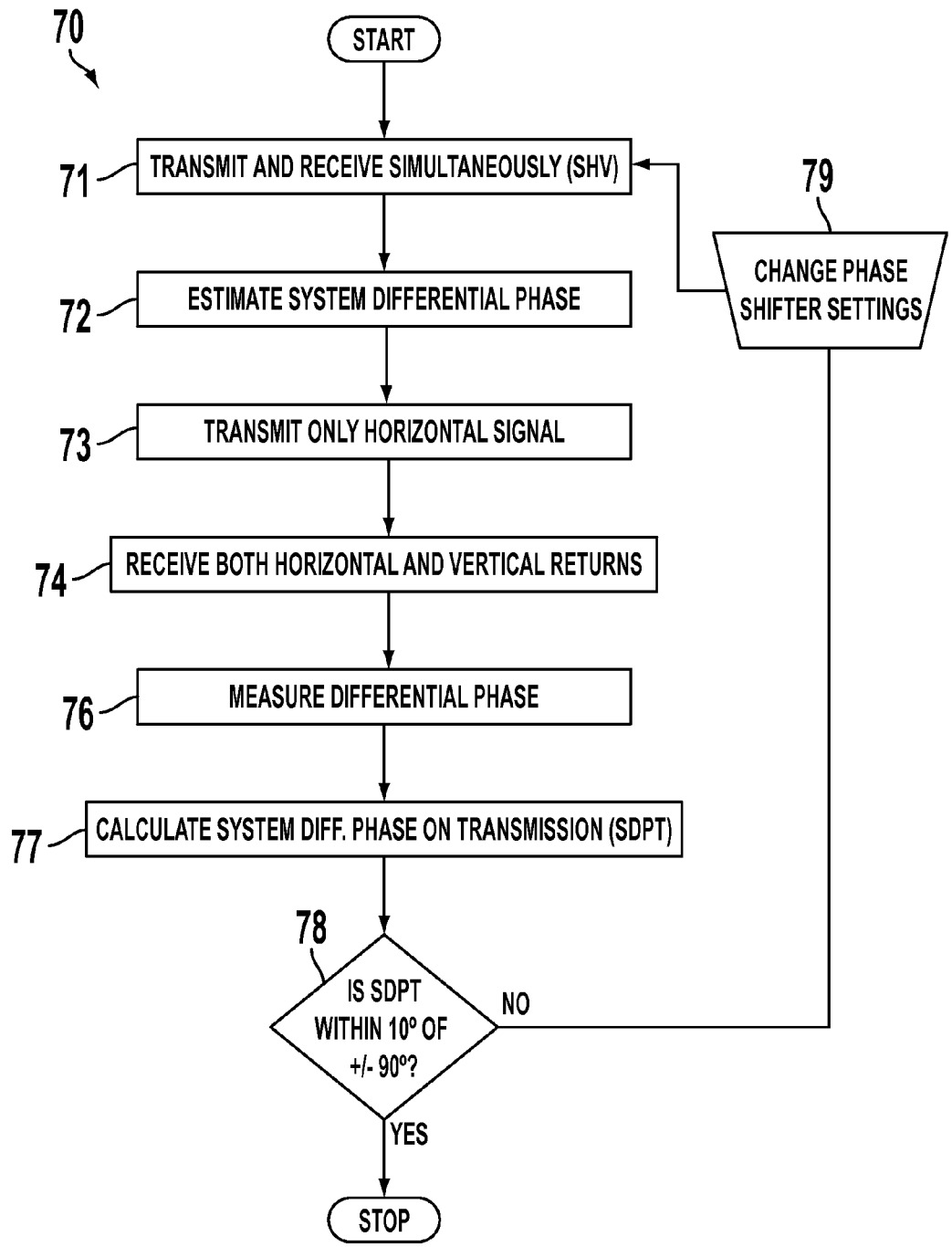
FIG. 4 is a process flow diagram for calibration of the phase shifter element in the invention.

Now referring to FIG. 4, a process 70 is shown to calibrate the phase shifter element 15 so that a difference of about 90° is maintained between V and H transmission streams in the system 10. A system 10 transmits and receives 71 radar signals in SHV mode during conditions in which satisfactory weather echoes may be obtained. The system differential phase $\Phi_{DP}^{(sys)}$ is estimated 72 based upon reflectivity signals received from the nearest satisfactory weather or object echo or reflection. System 10 then transmits only through the H channel 73 and receives reflectivity signals in both the H and V channels 74. This is a known transmission mode of LDR as discussed above. The signal data resulting from step 74 is then analyzed and the differential phase between the received H and V returns calculated 76 based upon the nearest satisfactory weather or object reflection. The value in step 76 is the system differential phase on reception or $\Phi_{DP}^{(r)}$. The system differential phase on transmission $\Phi_{DP}^{(t)}$ ("SDPT") is then be calculated 77 in accordance with the following equation:

$$\Phi_{DP}^{(t)} = \Phi_{DP}^{(sys)} - \Phi_{DP}^{(r)}.$$

A comparison is made 78 between $\Phi_{DP}^{(t)}$ and ±90° and if the SDPT is not within ±10° of ±90° an alteration to the phase shifter settings is made 79, with an assumption that the operators will know how to change the settings to result in a phase difference closer to ±90°. The steps 71 through 77 are repeated until the SDPT is about ±90°. This can also be thought of as requiring that magnitude of the SDPT be within ±10° of 90°. The last successful setting in the phase shifter is then used for operation of system 10 in CDR mode so that CDR calculations as shown in the method 60 may be made. It is recommended that the calibration method 70 be performed from time to time and be performed after any significant maintenance to the system 10.

Tables 1 and 2 appear below at the end of this disclosure. Table 1 is a listing of abbreviated C++ source code for the computer processing in an Intel processor computing environment such as a PC, including referencing Intel's Performance Primitives library, for executing the steps set out in the process 60 and as a software implementation of the above disclosed CDR processing methods. Table 2 provides a listing of the full C++ source code in sequential order for an Intel processor computing environment for the process 60.

Referring now to FIGS. 5A-B through 6A-C, it may be seen that a compact switch assembly 90 may be utilized in system 10 to replace grouped elements 30 shown in FIG. 1. Assembly 90 includes a series of mounting plates 92, support blocks 93, support angles 97, support hangers 103, and brackets 104 to support and arrange functional switch elements in the assembly 90 along with waveguides 91 and couplers 96 to connect those functional switch elements, and to permit transmission streams to be transferred between elements and manipulated.

Assembly 90 includes a pair of star switches 94 for controlling the flow of the pulse stream generated by a transmitter (not shown) through or around a power splitter 98 to control the mode of operation of the system 10. A pair of circulators 101 is connected to the power divider 98, with one circulator connected to a phase shifter 102 as shown. Phase shifter 102 includes a setting knob 105 to control the degree of phase alteration effected by shifter 102 and provide adjustments to the system. A choke 106 and dummy load 108 are also included, and a limiter 111 is positioned between the circulators 101 and any attached down-converter and receiver elements. The switching assembly 90 receives a full power energy pulse train from a transmitter via conduit location 123 and passes the streams out via conduit locations 121 (Vertical) and 122 (Horizontal), depending upon what mode the system 10 is in (e.g. SHV or LDR).

While I have shown my invention in one form, it will be obvious to those skilled in the art that it is not so limited but is susceptible of various changes and modifications without departing from the spirit thereof.

TABLE 1

```
// Get pointers to the actual data
Ipp32fc *hv_dat = (Ipp32fc *)&mom_hv[1];
float *h_dat = (float *)&mom_h[1];
float *v_dat = (float *)&mom_v[1];
int gates = mom_h->gates;
int out_size;
mag.resize(gates);
sum.resize(gates);
top.resize(gates);
out_size = gates * sizeof(float) + sizeof(mom_head);
void *data_out = malloc_mrp(out_size);
if (!data out)
    return NULL;
mom_head *mom_out = (mom_head *)data_out;
*mom_out = *mom_hv:
float *cdr_out = (float *)&mom_out[1];
// Calculate 2 times the magnitude of the cross-correlation
ippsMagnitude_32fc(hv_dat, mag, gates);
ippsMulC_32f_I(2.f, mag, gates);
// Calculate the sum of H and V powers
ippsAdd_32f(h_dat, v_dat, sum, gates);
// Calculate the numerator: Ph + Pv – 2 * |Rhv|
ippsSub_32f(mag, sum, top, gates);
// Calculate the denominator: Ph + Pv + 2 * |Rhv|
ippsAdd_32f_I(mag, sum, gates);
// Calculate the quotient
ippsDiv_32f(sum, top, cdr_out, gates);
```

```
#include<math.h>
#include<mm.h>
#include<ios>
#include<iqt_head.h>
#include<ipps.h>
#include<mom_head.h>
#include<cmd_class.h>
#include<cmd_structs.h>
#include<NDRX.h>
#include<work_buf.h>
using namespace std;
class cdr_cmd: public cmd_class
{
private:
    int pol_cmd;
    int dprf_cmd;
    cmdtype<pol_struct > pol;
public:
    cmdtype<int> dprf;
    cdr_cmd( ):cmd_class((char *) "cdr cmd")
    {
        pol_cmd = ndrx_cmds::get_id((char *) "pol");
        dprf_cmd = ndrx_cmds::get_id((char *) "dprf");
        add(pol_cmd, &pol);
        add(dprf_cmd, &dprf);
    }
    std::string *new_cmd( );
    inline int pol_mode( )
    {
        if(pol.value( ).mode == 2 && pol.value( ).sub_mode == 3)
            return true;
        else
            return false;
    }
};
class cdr_proc: public data_reg
{
```

-continued

```
private:
    data_class *cov0_h;
    data_class *cov0_v;
    data_class *covhv;
    work_buf_class<float> mag;
    work_our_class<float> sum;
    work_buf_class<float> top;
public:
    cdr_proc( ):data_reg ("cdr data") {cov0_h = cov0_v = covhv = 0;}
    ~cdr_proc( );
    std::string *data( );
};
class cdr
{
public:
    cdr_proc data;
    cdr_cmd cmd;
    dprf_class cdr_dprf;
    cdr( );
};
cdr cdr_mod;    //!< cdr module
std::string *cdr_cmd::new_cmd( )
{
    while (read_next_changed( )) ;
    return NULL;
}
cdr::cdr( ) : cdr_dprf(MOM_BIT_CDR)
{
    mm::reg_for_data(covhv_data, &data);
    mm::add_more(lag0_h, &data);
    mm:: add_more(lag0_v, &data);
    mm:: reg_for_data(cmd_data, &cmd);
    NDRX::add_dprf(&cdr_dprf);
}
std::string *cdr_proc::data( )
{
    // Make sure we have dual-pol data
    if (!cdr_mod.cmd.pol_mode( ))
    {
        return NULL;
    }
    data_types id = data_ptr->get_list_id( );
    check_id(id, lag0_h, cov0_h, data_ptr);
    check_id(id, lag0_v, cov0_v, data_ptr);
    check_id(id, covhv_data, covhv, data_ptr);
    data_ptr = NULL;
    // Check to make sure we have all the data sets
    if (!cov0_h || !cov0_v || !covhv)
        return NULL;
    mom_head *mom_h = (mom_head *)cov0_h->get_item_ptr( );
    mom_head *mom_v = (mom_head *)cov0_v->get_item_ptr( ):
    mom_head *mom_hv = (mom_head *)covhv->get_item_ptr( );
    // Make sure all three data sets are synced.
    if (mom_h->sync_count != mom_v->sync_count ||
        mom_h->sync_count != mom_hv->sync_count)
        return NULL;
    // Get pointers to the actual data
    Ipp32fc *hv_dat = (Ipp32fc *)&mom_hv[1];
    float *h_dat = (float *)&mom_h[1];
    float *v_dat = (float *)&mom_v[1];
    int gates = mom_h->gates;
    int out_size;
    mag.resize(gates);
    sum.resize(gates);
    top.resize(gates);
    out_size = gates * sizeof(float) + sizeof(mom_head);
    void *data_out = malloc_mrp(out_size);
    if (!data_out)
        return NULL;
    mom_head *mom_out = (mom_head *)data_out;
    *mom_out = *mom_hv;
    float *cdr_out = (float *)&mom_out [1];
    // Calculate 2 times the magnitude of the cross-correlation
    ippsMagnitude_32fc(hv_dat, mag, gates);
    ippsMulC_32f_I(2.f, mag, gates);
    // Calculate the sum of H and V powers
    ippsAdd_32f(h_dat, v_dat, sum, gates);
    // Calculate the numerator: Ph + Pv – 2 * |Rhv|
    ippsSub_32f(mag, sum, top, gates);
    // Calculate the denominator: Ph + Pv + 2 * |Rhv|
```

```
        ippsAdd_32f_I(mag, sum, gates);
        // Calculate the quotient
        ippsDiv_32f(sum, top, cdr_out, gates);
        malloc_item *mi = new malloc_item(data_out, out_size);
        mom_out->mom_mask = MOM_BIT_CDR;
        if (mi)
        {
          if (cdr_mod.cmd.dprf.value( ) >1 )
          {
            mm::pass_data(dprf_data, mi);
          }
          else
          {
            const float ln_to_dB = 4.342944819f;
            ippsLn32f_I(cdr_out, mom_out->gates);
            ippsMulC_32f_I(ln_to_dB, cdr_out, mom_out- >gates);
            mm::pass_data(out_data, mi);
          }
        }
        covhv->clear( );
        cov0_h->clear( );
        cov0_v->clear( );
        covhv = cov0_h = cov0_v = NULL;
        return NULL;
      }
    cdr_proc::~cdr_proc( )
    {
    }
```

Having set forth the nature of the invention, what is claimed is:

1. A method for measuring depolarization ratios in a radar, comprising the steps of:
   a. generating an energy pulse train suitable for radar transmissions;
   b. dividing said pulse train into two transmission streams;
   c. altering the phase of one said transmission stream with a phase shifter such that the difference in phase between each said transmission streams is about 90 degrees;
   d. after said phase altering step, transmitting said transmission streams into space through an orthomode transducer and receiving reflectivity signals;
   e. calculating the power of a horizontally polarized component of radar reflectivity data resulting from said transmission step;
   f. calculating the power of a vertically polarized component of radar reflectivity data resulting from said transmission step;
   g. calculating the cross-covariance between said horizontally polarized component and said vertically polarized component; and,
   h. calculating a circular depolarization ratio based upon said horizontally polarized power component, said vertically polarized power component, and said cross-covariance value.

2. The method as recited in claim 1, wherein said step of calculating a circular depolarization ratio based upon said horizontally polarized power component, said vertically polarized power component, and said cross-covariance value comprises $$CDR(dB) = 10\log\left(\frac{P_h + P_v - 2|R_{hv}|}{P_h + P_v + 2|R_{hv}|}\right);$$

where $P_h$ represents a power of a horizontally polarized component of said radar reflectivity data;
where $P_v$ represents a power of a vertically polarized component of said radar reflectivity data; and,
where $R_{hv}$ represents a complex covariance having its phase equal to an estimate of a differential phase $\Phi DP$ of transmissions in said radar system.

3. The method of claim 2, wherein said transmitting step comprises simultaneous transmissions of said transmission streams.

4. The method as recited in claim 1, wherein said step of calculating the power of a horizontally polarized component of radar reflectivity data comprises:
   a. the sum of the square of the magnitude of complex horizontal voltages samples taken over a range of 1 to M during a radar dwell time period, where M represents the number of radar samples taken during said radar dwell time period, and
   b. wherein said sum is divided by M.

5. The method as recited in claim 4, wherein said step of calculating the power of a vertically polarized component of radar reflectivity data comprises:
   a. the sum of the square of the magnitude of complex vertical voltages samples taken over a range of 1 to M during a radar dwell time period, where M represents the number of radar samples taken during said radar dwell time period, and
   b. wherein said sum is divided by M.

6. The method as recited in claim 5, wherein said step of calculating cross-covariance between said horizontally polarized component and said vertically polarized component comprises
   a. the sum of the product of the complex vertical and horizontal voltage samples taken over a range of 1 to M during a radar dwell time period, where M represents the number of radar samples taken during said radar dwell time period, and
   b. wherein said sum is divided by M.

7. The method as recited in claim 6, wherein said step of calculating a circular depolarization ratio based upon said horizontally polarized power component, said vertically polarized power component, and said cross-covariance value comprises $$CDR(dB) = 10\log\left(\frac{P_h + P_v - 2|R_{hv}|}{P_h + P_v + 2|R_{hv}|}\right);$$

where $P_h$ represents a power of a horizontally polarized component of said radar reflectivity data;
where $P_v$ represents a power of a vertically polarized component of said radar reflectivity data; and,
where $R_{hv}$ represents a complex covariance having its phase equal to an estimate of a differential phase $\Phi DP$ of transmissions in said radar system.

8. The method as recited in claim 7, further comprising the steps of:
   a. prior to said phase altering step, configuring said phase shifter such that the differential phase between said transmitted signals is about 90 degrees through the following steps:
      i. simultaneously transmitting horizontally and vertically oriented radar signals into space;
      ii. receiving reflectivity signals from a selected object in said space;
      iii. estimating a system differential phase for said object;
      iv. exclusively transmitting a horizontally oriented radar signal into space;

v. after said exclusively transmitting step, receiving both horizontally and vertically oriented radar reflectivity signals;

vi. measuring the differential phase between said received horizontally and vertically oriented radar reflectivity signals;

vii. calculating the system differential phase of said radar as the difference between the results in steps iii and vi;

viii. if the magnitude of the calculated system differential phase is greater than 10 degrees difference from 90 degrees, adjust the phase shifter to produce a system differential phase magnitude closer to 90 degrees;

ix. repeat steps i through viii until the magnitude of the system differential phase is less than 10 degrees from 90 degrees.

9. The method of claim 8, wherein said steps of calculating the power of a horizontally polarized component, calculating the power of a vertically polarized component, and calculating the cross-covariance between said horizontally polarized component and said vertically polarized component are performed in parallel.

10. The method as recited in claim 7, wherein said step of altering the phase of one of said transmission streams with a phase shifter comprises iteratively executing said method for measuring depolarization ratios in a radar, altering said phase shifter by increments of 10 degrees with each said iteration, recording the calculated circular depolarization ratio for each iteration, and implementing the phase shifter setting that creates a maximal circular depolarization ratio.

11. The method as recited in claim 1, further comprising the steps of:
   a. prior to said phase altering step, configuring said phase shifter such that the differential phase between said transmitted signals is about 90 degrees through the following steps:
      i. simultaneously transmitting horizontally and vertically oriented radar signals into space;
      ii. receiving reflectivity signals from a selected object in said space;
      iii. estimating a system differential phase for said object;
      iv. exclusively transmitting a horizontally oriented radar signal into space;
      v. after said exclusively transmitting step, receiving both horizontally and vertically oriented radar reflectivity signals;
      vi. measuring the differential phase between said received horizontally and vertically oriented radar reflectivity signals;
      vii. calculating the system differential phase of said radar as the difference between the results in steps iii and vi;
      viii. if the magnitude of the calculated system differential phase is greater than 10 degrees difference from 90 degrees, adjust the phase shifter to produce a system differential phase magnitude closer to 90 degrees;
      ix. repeat steps i through viii until the magnitude of the system differential phase is less than 10 degrees from 90 degrees.

12. The method of claim 11, wherein said steps of calculating the power of a horizontally polarized component, calculating the power of a vertically polarized component, and calculating the cross-covariance between said horizontally polarized component and said vertically polarized component are performed in parallel.

13. The method as recited in claim 1, wherein said step of altering the phase of one of said transmission streams with a phase shifter comprises iteratively executing said method for measuring depolarization ratios in a radar, altering said phase shifter by increments of 10 degrees with each said iteration, recording the calculated circular depolarization ratio for each iteration, and implementing the phase shifter setting that creates a maximal circular depolarization ratio.

14. In a simultaneous dual polarization weather radar, a method for calculating circular depolarization ratios in said radar, comprising the steps of:
   a. configuring a phase shifter in said weather radar to alter the phase of one transmission steam in said weather radar to have a different phase relative to a second transmission stream in said weather radar by about 90 degrees;
   b. transmitting said two transmission streams into space through an antenna having an orthomode transducer positioned thereon;
   c. receiving reflectivity signals from said transmitting step in said weather radar;
   d. calculating the power of a horizontally polarized component in said radar reflectivity signals;
   e. calculating the power of a vertically polarized component in said radar reflectivity signals;
   f. calculating the cross-covariance between said horizontally polarized component and said vertically polarized component; and,
   g. calculating a circular depolarization ratio based upon said horizontally polarized power component, said vertically polarized power component, and said cross-covariance value.

15. The method as recited in claim 14, further comprising the steps of:
   a. prior to said phase altering step, configuring said phase shifter such that the differential phase between said transmitted signals is about 90 degrees through the following steps:
      i. simultaneously transmitting horizontally and vertically oriented radar signals into space;
      ii. receiving reflectivity signals from a selected object in said space;
      iii. estimating a system differential phase for said object;
      iv. exclusively transmitting a horizontally oriented radar signal into space;
      v. after said exclusively transmitting step, receiving both horizontally and vertically oriented radar reflectivity signals;
      vi. measuring the differential phase between said received horizontally and vertically oriented radar reflectivity signals;
      vii. calculating the system differential phase of said radar as the difference between the results in steps iii and vi;
      viii. if the magnitude of the calculated system differential phase is greater than 10 degrees difference from 90 degrees, adjust the phase shifter to produce a system differential phase magnitude closer to 90 degrees;
      ix. repeat steps i through viii until the magnitude of the system differential phase is less than 10 degrees from 90 degrees.

16. The method as recited in claim 15, wherein said step of calculating the power of a horizontally polarized component of radar reflectivity data comprises:
   a. the sum of the square of the magnitude of complex horizontal voltages samples taken over a range of 1 to M during a radar dwell time period, where M represents the number of radar samples taken during said radar dwell time period, and
   b. wherein said sum is divided by M.

17. The method as recited in claim 15, wherein said step of calculating the power of a vertically polarized component of radar reflectivity data comprises:
   a. the sum of the square of the magnitude of complex vertical voltages samples taken over a range of 1 to M during a radar dwell time period, where M represents the number of radar samples taken during said radar dwell time period, and
   b. wherein said sum is divided by M.

18. The method as recited in claim 15, wherein said step of calculating cross-covariance between said horizontally polarized component and said vertically polarized component comprises
   a. the sum of the product of the complex vertical and horizontal voltage samples taken over a range of 1 to M during a radar dwell time period, where M represents the number of radar samples taken during said radar dwell time period, and
   b. wherein said sum is divided by M.

19. The method as recited in claim 14, wherein said step of altering the phase of one of said transmission streams with a phase shifter comprises iteratively executing said method for measuring depolarization ratios in a radar, altering said phase shifter by increments of 10 degrees with each said iteration, recording the calculated circular depolarization ratio for each iteration, and implementing the phase shifter setting that creates a maximal circular depolarization ratio.

20. The method as recited in claim 19, wherein said step of calculating a circular depolarization ratio based upon said horizontally polarized power component, said vertically polarized power component, and said cross-covariance value comprises $$CDR(\text{dB}) = 10\log\left(\frac{P_h + P_v - 2|R_{hv}|}{P_h + P_v + 2|R_{hv}|}\right);$$

where $P_h$ represents a power of a horizontally polarized component of said radar reflectivity data;
   where $P_v$ represents a power of a vertically polarized component of said radar reflectivity data; and,
   where $R_{hv}$ represents a complex covariance having its phase equal to an estimate of a differential phase ΦDP of transmissions in said radar system.

21. The method as recited in claim 20, wherein said step of calculating cross-covariance between said horizontally polarized component and said vertically polarized component comprises:
   a. the sum of the product of the complex vertical and horizontal voltage samples taken over a range of 1 to M during a radar dwell time period, where M represents the number of radar samples taken during said radar dwell time period,
   b. wherein said sum is divided by M.

22. The method as recited in claim 14, wherein said step of calculating a circular depolarization ratio based upon said horizontally polarized power component, said vertically polarized power component, and said cross-covariance value comprises $$CDR(\text{dB}) = 10\log\left(\frac{P_h + P_v - 2|R_{hv}|}{P_h + P_v + 2|R_{hv}|}\right);$$

where $P_h$ represents a power of a horizontally polarized component of said radar reflectivity data;
   where $P_v$ represents a power of a vertically polarized component of said radar reflectivity data; and,
   where $R_{hv}$ represents a complex covariance having its phase equal to an estimate of a differential phase ΦDP of transmissions in said radar system.

23. The method as recited in claim 14, further comprising the steps of:
   a. prior to said phase altering step, configuring said phase shifter such that the differential phase between said transmitted signals is about 90 degrees through the following steps:
      i. estimating the system differential phase of said weather radar;
      ii. measuring the system differential phase on reception of said weather radar;
      iii. calculate the system differential phase on transmission for said weather radar;
      iv. if the magnitude of the system differential phase on transmission for said weather radar is not within 10 degrees of 90 degrees, adjust the phase shifter and recalculate the system differential phase on transmission for said radar; and,
      v. repeat said adjustment step until the magnitude of the system differential phase on transmission for said weather radar is within 10 degrees of 90 degrees.

24. A method of retrofitting a simultaneous dual polarization weather radar to enable said radar to calculate circular depolarization ratios while in simultaneous transmission and reception of horizontal and vertically oriented radar waves, comprising the steps of:
   a. installing a phase shifter between the power splitter and a circulator in said weather radar such that said phase shifter may affect the phase of one radar transmission stream in said radar;
   b. calibrating the phase shifter such that the phase of one radar transmission stream is about 90 degrees off-set from said other radar stream;
   c. activating the phase shifter and transmitting said transmission streams into space through an antenna, wherein said transmission streams are spatially oriented by elements associated with said antenna such that one transmission stream is orthogonal relative to said other stream;
   d. receiving reflectivity signals;
   e. calculating the power of a horizontally polarized component of said radar reflectivity signals;
   f. calculating the power of a vertically polarized component of radar reflectivity signals;
   g. calculating the cross-covariance between said horizontally polarized component and said vertically polarized component; and,
   h. calculating a circular depolarization ratio based upon said horizontally polarized power component, said vertically polarized power component, and said cross-covariance value.

25. The method as recited in claim 24, wherein said step of calculating the power of a horizontally polarized component of said radar reflectivity signals is based upon the magnitude of complex horizontal voltage samples taken by said weather radar.

26. The method as recited in claim 24, wherein said step of calculating the power of a vertically polarized component of said radar reflectivity signals is based upon the magnitude of complex vertical voltage samples taken by said weather radar.

27. The method as recited in claim 24, wherein said step of calculating the cross-covariance is based upon the power of both vertically and horizontally polarized voltage samples taken by said weather radar.

28. The method as recited in claim 24, wherein said step of calculating a circular depolarization ratio is based upon the logarithm of power values obtained in said retrofitting method.

* * * * *